(No Model.)

W. MURPHY.
CORN CULTIVATOR AND WEED CUTTER.

No. 362,033. Patented Apr. 26, 1887.

Witnesses

Inventor.
William Murphy

UNITED STATES PATENT OFFICE.

WILLIAM MURPHY, OF OMIO, KANSAS.

CORN-CULTIVATOR AND WEED-CUTTER.

SPECIFICATION forming part of Letters Patent No. 362,033, dated April 26, 1887.

Application filed August 27, 1886. Serial No. 212,000¼. (No model.)

*To all whom it may concern:*

Be it known that I, WILLIAM MURPHY, of Omio, in the county of Jewell and State of Kansas, have invented certain new and useful Improvements in Combined Corn-Cultivators and Weed-Cutters; and I do hereby declare the following to be a full, clear, and exact description of the invention, such as will enable others skilled in the art to which it pertains to make and use it, reference being had to the accompanying drawings, which form part of this specification.

My invention relates to an improvement in combined corn-cultivators and weed-cutters; and it consists in the combination and arrangement of parts, which will be more fully described hereinafter, and pointed out in the claims.

The object of my invention is to produce a machine by means of which listed corn can be cultivated, the clods crushed, the weeds removed, and the stalks and other trash cut on both sides of the row at once.

Figure 1:
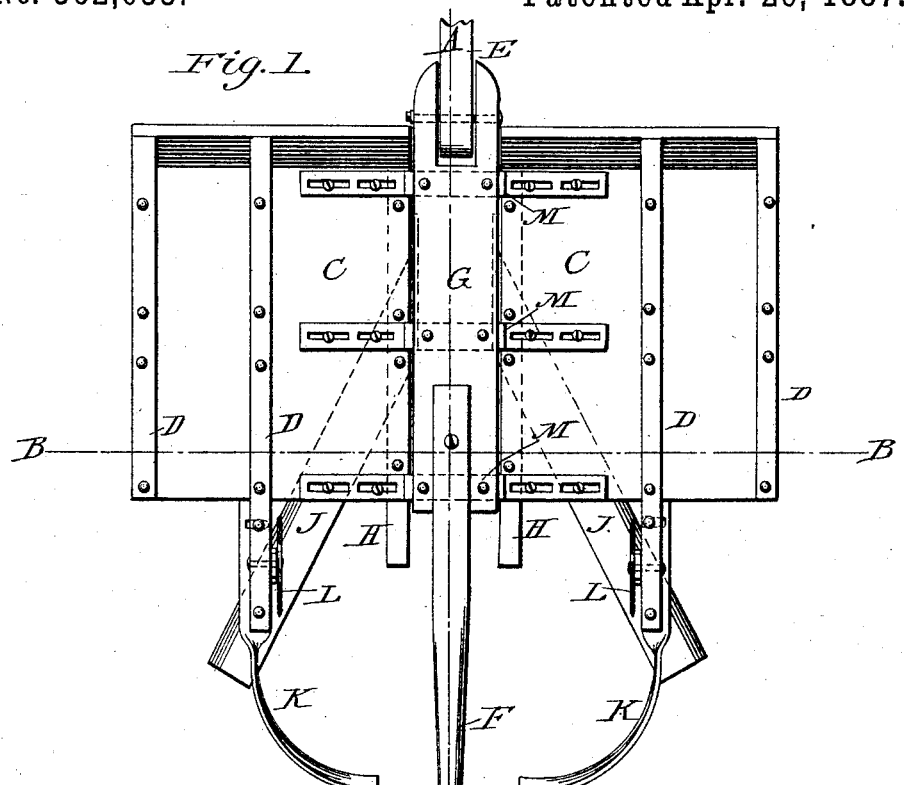
Figure 2:
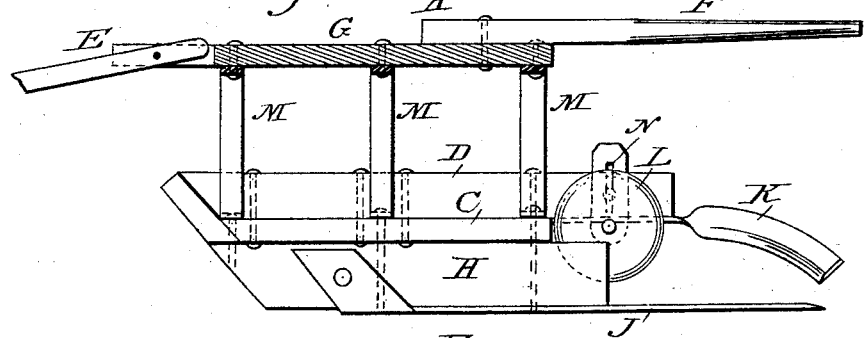
Figure 3:
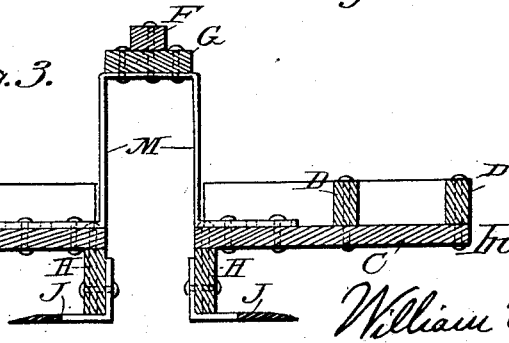

Figure 1 is a plan view of a machine embodying my invention. Fig. 2 is a vertical section taken on the line A A of Fig. 1. Fig. 3 is a vertical cross-section taken on the line B B of Fig. 1.

H represents two runners, which are rigidly secured to the under sides of the two adjustable floats, C, and which are intended to run upon opposite sides of the row of growing corn. Secured rigidly to the top edges of these runners H are the floats C, which are flat upon their under sides, and incline upward at their front edges, so as to glide over the ground and crush any clods which may be in the way, and at the same time serve to level the earth in between the furrows. These floats are braced and strengthened upon their tops by means of the beams D D and by the lower slotted ends of the arches M. The lower ends of the arches M are slotted, as shown in Fig. 1, so that the floats C and the runners H can be adjusted laterally for the purpose of increasing or decreasing the distance between the runners H, as may be desired. These runners are adjusted in relation to each other, according to the width of the row of growing grain.

The inner beams, D, are longer than the two outer ones, and have their rear ends project a suitable distance beyond the rear edge of the float, for the purpose of having the curved knives or gathering devices K secured to them, and to serve as supports for the rolling colters L. The gathering-knives K serve to draw the earth toward the corn upon opposite sides, and are made adjustable by means of slots, as shown in Fig. 1, so as to regulate the amount of earth which shall be moved toward the corn upon each side. The rolling colters L are journaled upon the slotted vertically-adjustable bearings N, which can be adjusted vertically for the purpose of regulating the height of the colters above the ground. These colters L serve to cut the cornstalks or other trash which may be between the rows.

Secured to the runners H are the two knives or cutters J, which are placed at any suitable angle thereto, and which cut the weeds upon each side of the row of growing corn. Upon the top of the arches M is placed the beam G, to the front end of which the tongue E is pivoted, and which has the handle F secured to its rear end. By means of the handle the machine is lifted around or guided, at the will of the operator.

Having thus described my invention, I claim—

1. The combination of the beam G, the arches M, secured thereto, and provided with slots in their lower ends, the floats C, and the runners H, substantially as shown.

2. The combination of the beam G, the arches M, the float C, the runners H, and the knives J, which are secured to the runners, substantially as described.

3. The combination of the runners, the arches M, the float C, gathering devices K, and the rolling colters L, substantially as set forth.

In testimony whereof I affix my signature in presence of two witnesses.

WILLIAM MURPHY.

Witnesses:
  J. F. MILES,
  E. T. RILEY.